| (12) | United States Patent | (10) Patent No.: | US 7,455,743 B2 |
|---|---|---|---|
| | Kramer et al. | (45) Date of Patent: | *Nov. 25, 2008 |

(54) ADHESIVELY BONDED SEAMS AND METHODS OF FORMING SEAMS

(75) Inventors: Paul F. Kramer, Berkeley, CA (US); Gaston MacMillan, El Cerrito, CA (US)

(73) Assignee: Mountain Hardwear, Inc., Richmond, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/569,494

(22) Filed: Nov. 21, 2006

(65) Prior Publication Data

US 2007/0181241 A1 Aug. 9, 2007

Related U.S. Application Data

(63) Continuation-in-part of application No. 10/851,409, filed as application No. PCT/US2005/018135 on May 23, 2005, now Pat. No. 7,005,021.

(60) Provisional application No. 60/472,159, filed on May 21, 2003.

(51) Int. Cl.
*B32B 37/00* (2006.01)

(52) U.S. Cl. .................... 156/73.4; 156/157; 156/272.2; 428/57

(58) Field of Classification Search ................ 156/73.1, 156/73.4, 157, 272.2, 379.6, 502, 580.1, 156/580.2; 428/57
See application file for complete search history.

(56) References Cited

U.S. PATENT DOCUMENTS

| 2,115,368 | A | 4/1938 | Lustberg |
| 2,435,509 | A | 2/1948 | Pfeffer, Jr. et al. |
| 2,744,844 | A | 5/1956 | Wood, Jr. et al. |
| 2,985,555 | A | 5/1961 | Sherbrook |
| 4,156,293 | A | 5/1979 | Off |
| 4,357,197 | A | 11/1982 | Wilson |
| 4,365,355 | A | 12/1982 | Off |
| 4,461,662 | A | 7/1984 | Onishi |
| 4,523,336 | A | 6/1985 | Truman |
| 4,605,578 | A | 8/1986 | Emrich et al. |
| 4,670,073 | A | 6/1987 | Langley |

(Continued)

FOREIGN PATENT DOCUMENTS

GB 2 071 564 9/1981

(Continued)

*Primary Examiner*—James Sells
(74) *Attorney, Agent, or Firm*—Stoel Rives LLP

(57) ABSTRACT

A method of forming a stitchless, adhesively bonded seam involves placing a first strip of adhesive between the outside surface of first and second sheets of material along an edge of the second sheet. At least a portion of a second strip of adhesive is positioned against a first portion of the inside surface of the second sheet along the edge thereof. The second sheet of material is folded such that a second portion of the inside surface overlies the second strip of adhesive. In some embodiments the first and second strips of adhesive are replaced by a single longitudinally folded strip of adhesive. Energy may be applied, via an ultrasonic seam bonding machine or other means, to activate the adhesive. Seams made according to the disclosed methods may be used for garments, sports articles, and other items made of fabric or other sheet material.

54 Claims, 3 Drawing Sheets

U.S. PATENT DOCUMENTS

| | | | |
|---|---|---|---|
| 4,706,316 A | 11/1987 | Tanzi | |
| 4,737,212 A | 4/1988 | Emrich et al. | |
| 4,906,497 A | 3/1990 | Hellmann et al. | |
| 5,336,346 A | 8/1994 | Meltzer et al. | |
| 5,340,649 A | 8/1994 | Roeker et al. | |
| 5,662,638 A | 9/1997 | Johnson et al. | |
| 5,885,679 A | 3/1999 | Yasue et al. | |
| 6,079,343 A | 6/2000 | Wong | |
| 6,114,676 A | 9/2000 | Jerby et al. | |
| 6,120,489 A | 9/2000 | Johnson et al. | |
| 6,375,770 B1 | 4/2002 | Meltzer et al. | |
| 6,471,803 B1 | 10/2002 | Pelland et al. | |
| 6,497,934 B1 | 12/2002 | Mahn et al. | |
| 6,558,809 B1 | 5/2003 | Kelch et al. | |
| 6,694,528 B1 | 2/2004 | Chang | |
| 6,797,352 B2 | 9/2004 | Fowler | |
| 7,005,021 B2 | 2/2006 | Kramer | |
| 2003/0075258 A1 | 4/2003 | Zhang et al. | |
| 2003/0126673 A1 | 7/2003 | Yardley | |
| 2005/0022920 A1 | 2/2005 | Fowler | |

FOREIGN PATENT DOCUMENTS

| | | |
|---|---|---|
| JP | 2002-242014 | 8/2002 |
| WO | WO 01/81082 A1 | 11/2001 |

ADHESIVELY BONDED SEAMS AND METHODS OF FORMING SEAMS

RELATED APPLICATIONS

This application is a national phase entry under 35 U.S.C. § 371 of International Application No. PCT/US2005/018135, filed May 23, 2005, which is a continuation-in-part of and claims priority under 35 U.S.C. §§ 365(c) and 120 from U.S. Application Ser. No. 10/851,409, filed May 21, 2004, now U.S. Pat. No. 7,005,021, which claims the benefit under 35 U.S.C. § 119(e) of U.S. Provisional Application No. 60/472,159, filed May 21, 2003.

TECHNICAL FIELD

This application relates to methods of forming a seam by joining together pieces of fabric or other sheet material using an adhesive, and to seams and articles made by such methods.

BACKGROUND

For many years sewing machines have been used to join sheets of fabric together by basically tying the sheets together with thread. Recently, garment manufacturers have started joining sheets of fabric together by welding overlapping edges using heat and pressure. When heat is applied, the overlapping edge portions of the sheets melt and fuse together to form a seam. This method works reasonably well with certain thermoplastic materials, but less well with many other materials, such as certain woven fabrics that can become brittle after heating and thereafter easily rip.

An alternative to creating seams using welding techniques involves joining fabric together using an adhesive. One such known technique utilizes a strip of adhesive positioned between overlapping edges of sheets of fabric. Pressure and heat are applied to the overlapping fabric and the adhesive to melt the adhesive and form an adhesive bond that joins the overlapping fabric sheets. Known adhesively bonded seams exhibit several limitations, depending upon the manner of joining the fabric and the type of fabric used.

One example of a known adhesively bonded seam is illustrated in FIG. 1. With reference to FIG. 1, the fabric sheets are joined "face-to-face" similarly to a standard sewn seam, resulting in a glued seam that is subject to separation and failure when opposing tensile forces F are applied to the fabric sheets. In this example, the forces F are shown at an angle of approximately 900 to the plane of the seam. Such seams are subject to failure due to the fact that the forces F are applied to the seam at a substantial angle relative to the plane of the seam. When the angle is significant, as in the example of FIG. 1, the tensile forces F are primarily acting on the outer edge of the seam, where the two sheets of fabric meet at the edge of the adhesive (and from where the sheets diverge). The concentration of stress along the edge of this seam may cause the seam to peel apart and fail.

Another known type of adhesively bonded seam, illustrated in FIG. 2, is typically formed by overlapping the outside or facing surface of a first sheet of fabric to the inside or backing surface of a second sheet of fabric and joining the overlapping surfaces with adhesive. In this instance, the resulting adhesively bonded lap seam is typically stronger than the seam of FIG. 1 because the tensile forces F are applied approximately parallel to the seam of FIG. 2. However, the seam of FIG. 2 results in a raw edge of material being exposed on the outside of the garment, and the raw edge may easily fray or unravel in normal use. The seam structure of FIG. 2 may also not work well with many modern fabrics of the kind having a laminate structure comprising an outer facing fabric, having a high tensile strength, and an inner backing fabric, having a relatively low tensile strength. When tensile forces F are applied to sheets of laminate fabric of this kind that are adhesively joined as depicted in FIG. 2, the inner backing fabric may be prone to de-laminate or otherwise separate from the outer facing fabric, ruining the garment.

Thus, the present inventors have recognized a need for improved adhesively bonded seams and methods of forming such seams.

SUMMARY

A method of forming a stitchless, adhesively bonded seam includes providing first and second sheets of material, each having an outside or facing surface, an inside or backing surface, and an edge, and adhesively bonding them together using one or more strips of adhesive. The outside surface of the first sheet of material is positioned proximal to the outside surface and edge of the second sheet of material, respectively, and an elongate first strip of adhesive is placed therebetween such that a first side of the first strip of adhesive is adjacent the outside surface of the first sheet of material and at least a portion of a second side of the first strip of adhesive is adjacent the outside surface of the second sheet of material along the edge of the second sheet of material. At least a portion of a second strip of adhesive is placed against a first portion of the inside surface of the second sheet of material, opposite the first strip of adhesive and extending along the edge of the second sheet of material, and the second sheet of material is folded back over the first portion thereof such that a second portion of the inside surface of the second sheet of material overlies the second strip of adhesive. In some embodiments, the first and second strips of adhesive are replaced by a single elongate strip of adhesive folded lengthwise. After the sheets of material and strip(s) of adhesive are assembled, energy may be applied to the strip(s) of adhesive to activate the adhesive and thereby join the outside surface of the first sheet of material to the outside surface of the second sheet of material and join the first portion of the inside surface of the second sheet of material to the second portion thereof. The energy may be applied in a variety of forms, in one or two steps, or not at all, and with or without added compressive force.

Additional aspects and advantages will be apparent from the following detailed description of preferred embodiments, which proceeds with reference to the accompanying drawings.

DETAILED DESCRIPTION OF PREFERRED EMBODIMENTS

Figure 3:
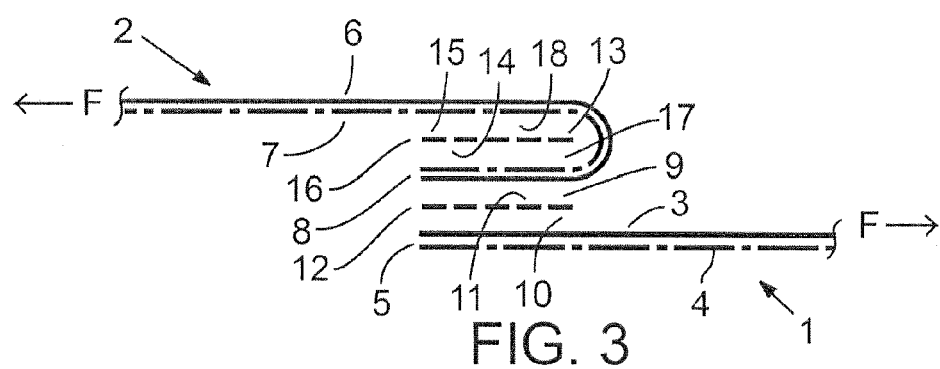
FIG. 3 is a cross-sectional diagram of two sheets of material joined by an adhesively bonded seam in accordance with a first embodiment.

FIG. 3 illustrates a first embodiment of a stitchless, adhesively bonded seam for a garment, sports article, or other item made of sheet material. As used in this description, "stitchless" means a seam that is not formed by stitches of thread or thread-like material. FIG. 3 shows a first sheet of fabric 1 that has an outside or facing surface 3 (depicted as a solid line), an inside or backing surface 4 (depicted as a broken line), and an elongate edge 5. Similarly, a second sheet of fabric 2 has an outside or facing surface 6 (depicted as a solid line), an inside or backing surface 7 (depicted as a broken line), and an elongate edge 8. The outside surface 3 and edge 5 of the first sheet of fabric 1 are positioned proximal to the outside surface 6 and edge 8 of the second sheet of fabric 2, respectively. A first elongate strip of adhesive 9, having opposing first and second sides 10 and 11, respectively, and a longitudinal edge 12, is positioned between the first and second sheets of fabric, 1 and 2, respectively, such that the longitudinal edge 12 is adjacent the edges 5 and 8 of the first and second sheets of fabric 1 and 2. The first side 10 of the first strip of adhesive 9 is positioned against the outside surface 3 of the first sheet of fabric 1, and the second side 11 of the first strip of adhesive 9 is positioned against the outside surface 6 of the second sheet of fabric 2. A second elongate strip of adhesive 13, having first and second sides 14 and 15, respectively, and a longitudinal edge 16, is positioned such that its longitudinal edge 16 is adjacent the edge 8 of the second sheet of fabric 2, and such that its first side 14 is against a first portion 17 of the inside surface 7 of the second sheet of fabric 2. The second sheet of fabric 2 is folded over such that a second portion 18 of its inside surface 7 overlies the second side 15 of the second strip of adhesive 13. After assembly of the sheets of fabric 1, 2 and strips of adhesive 9, 13, energy is applied to the strips of adhesive 9, 13 to thereby activate, soften, or melt the adhesive so that it will bond to the fabric and form a completed adhesively bonded seam. A preferred method of applying energy involves applying ultrasonic sound pressure via a reciprocating ultrasonic horn that emits ultrasonic energy while pressing the assembled sheets of fabric 1, 2 and strips of adhesive 9, 13 against an anvil. The ultrasonic sound pressure increases the temperature of the first strip of adhesive 9 until it softens or melts to form an adhesive bond joining the outside surfaces 3 and 6 of the first and second sheets of fabric 1 and 2, respectively. Similarly, the ultrasonic sound pressure increases the temperature of the second strip of adhesive 13 until it softens or melts to form another adhesive bond joining the first and second portions 17 and 18, respectively, of the inside surface 7 of the second sheet of fabric 2.

Ultrasonic sound pressure is preferably applied using an ultrasonic seam bonding machine, of the kind sold by Sonobond Ultrasonics, Inc. of West Chester, Pa., USA or Ardmel Automation Ltd. of Glenrothes, Fife, Scotland. Ultrasonic seam bonding machines of this class include feed rollers or reciprocating feed dogs that allow material to be fed through the machine in much the same manner as a conventional sewing machine. In an ultrasonic seam bonding machine with reciprocating feed dogs, a feed stroke may be less than the size of the ultrasonic horn (in the direction of feed) so that each point on the seam is exposed to ultrasonic sound pressure multiple times as the seam is fed through the ultrasonic bonding machine. For example, a machine made by the Ardmel Automation Ltd. includes an ultrasonic horn that is approximately ¼ inch (6.35 mm) long, but has a feed stroke of only about 1/16 inch (1.59 mm). Thus, as a seam feeds past the horn, each point along the seam will be exposed four times to the ultrasonic sound pressure produced by the ultrasonic horn. Exposing the adhesive to the ultrasonic sound pressure multiple times may improve the strength of the resulting adhesively bonded seam. In other embodiments, another form of energy, such as heat, radio frequency radiation, microwave radiation, or other wavelengths of electromagnetic radiation, may be applied to activate the adhesive by heating it to thereby soften or melt the adhesive, or to otherwise trigger a chemical reaction. In still other embodiments, the particular adhesive used may not require the application of added energy for activation, and the step of applying energy may be omitted altogether. Preferably a compressive force is applied to the first and second sheets of material and the first and second strips of adhesive during the application of energy to assist in forming the adhesive bond; however, it is not always necessary. Added energy may be applied in one, two, or more steps. After passing the assembled material through the ultrasonic seam bonding machine or otherwise exposing it to applied energy, the adhesive is allowed to set, by cooling or otherwise, so that it forms a strong adhesive bond with or between the sheets of material 1, 2.

With most woven or knit fabrics and textiles, an extruded or blown thermoplastic film is used as the adhesive so that the applied energy causes the adhesive to melt and flow into surface discontinuities of the fabric or textile and to thereby form a strong mechanical bond with the material. Polyurethane strips are suitable adhesives for this purpose. Other possible adhesives include polyester films, epoxy, and cyanoacrylates (such as isocyanate—the so-called super glue). Exemplary polyurethane adhesives include those sold by the Ardmel Group of Glenrothes, Fife, Scotland; by Bemis Associates, Inc. of Shirley, Mass., USA under the trademark SEWFREE®; and by Adhesive Films, Inc. of Pine Brook, N.J., USA. However, some synthetic materials and films have surfaces that do not readily lend themselves to a mechanical adhesive bond. For such synthetic materials and films, a chemically-bonding adhesive matched to the material type may be used.

The present inventors have found that seams can be made between sheets of almost any woven and woven composite fabric using the methods described herein. Exemplary woven and woven composite fabrics of this category include waterproof breathable laminate fabric, such as the 2-layer and 3-layer laminates of fabric and waterproof breathable membranes sold under the trademarks GORE-TEX, PACKLITE, CONDUIT, ENTRANT, EVENT, SYPATEX, and others; lightweight rainwear fabrics, such as EPIC™ ripstop nylon fabric with durable water repellant coating sold by Mountain Hardwear, Inc., PRECIP sold by Marmot, and ENTRANT DT 2.5 sold by Toray Coatex Co., Ltd.; wind barrier fabrics of the kind sold under the trademarks WINDSTOPPER, SCHOELLER, POWERSHIELD, WINDBLOCK, and others; and other coated and uncoated woven fabrics such as CORDURA nylons, stretch wovens, taslans, and SCHOELLER DRY SKIN. The seam manufacturing methods disclosed herein are also suitable for use with non-woven fabrics, including knit fabrics, such as LYCRA and others; scrims, such as Pelon, for example; and non-woven materials, such as synthetic films and sheeting. Because seams can be made according to the disclosed embodiments in a wide range of materials and because such seams are generally strong and highly waterproof, the methods described herein are particularly suitable for use in making garments (including clothing, footwear, headwear, gloves, etc., and especially outerwear and sportswear) and in making sports articles such as tents, backpacks, sleeping bags, luggage, etc.

Turning again to FIG. 3, an alternative method of activating the adhesive strips 9, 13 involves applying energy in two steps or passes rather than the single step or pass described above. In this instance, after the first strip of adhesive 9 is positioned between the first and second sheets of fabric 1 and 2, and before the second strip of adhesive 13 is in place, ultrasonic sound pressure is applied in a first pass to form an adhesive bond joining the first and second sheets of fabric 1 and 2. Then, after the second strip of adhesive 13 is positioned between the first and second portions 17 and 18 of the second sheet of fabric 2, ultrasonic sound pressure is applied in a second pass to form an adhesive bond between the first and second portions 17 and 18 of the second sheet of fabric 2.

In yet another method, one or both of the strips of adhesive 9, 13 may include a peelable backing sheet such as release paper (not shown). After the first strip of adhesive 9 is positioned between the first and second sheets of fabric 1 and 2 (and any backing sheet of the first strip of adhesive 9 is removed), the second strip of adhesive 13 is positioned adjacent the second sheet of fabric 2 with its backing sheet (not shown) facing outward. Ultrasonic sound pressure is then applied to the strips of adhesive 9 and 13, to form an adhesive bond between the first and second sheets of fabric 1 and 2 and between the second strip of adhesive 13 and the second sheet of fabric 2. The backing sheet of the second strip of adhesive 13 is then removed and the second sheet of fabric 2 is folded over the second strip of adhesive 13. Finally, ultrasonic sound pressure is applied to the second strip of adhesive 13 to form an adhesive bond between the first and second portions, 17 and 18, of the second sheet of fabric. Other methods of assembling the seam of FIG. 3 are considered to be within the scope of the present disclosure and may, for example, involve an order of assembly which is the reverse of the order of assembly disclosed in connection with the above-described embodiments.

Figure 1:
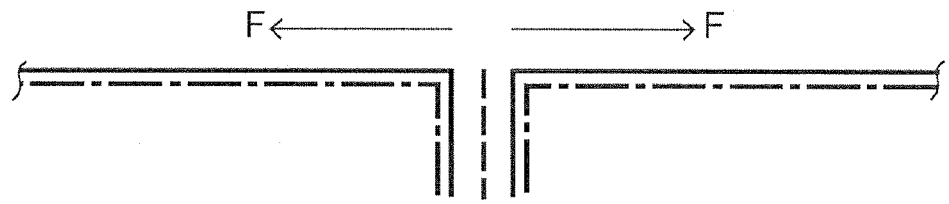
FIG. 1 (PRIOR ART) is a cross-sectional diagram of two sheets of fabric that have been adhesively bonded together in a face-to-face orientation along margins of the facing surfaces of the sheets.
Figure 2:
FIG. 2 (PRIOR ART) is a cross-sectional diagram of two sheets of fabric that have been adhesively bonded together in a simple overlapping configuration.

Depending on the type of fabrics that are being joined, this seam may be stronger than the seam illustrated in FIG. 1 because the tensile forces F will generally be parallel to the adhesively bonded surfaces of the seam and, therefore, distributed across a larger area of the adhesively bonded surfaces. Moreover, for multi-layer laminate fabrics having facing and backing layers of differing tensile strengths or stretch characteristics, the seam of FIG. 3 may substantially reduce the tendency of the weaker layer of the fabric to stretch relative to the stronger layer or layers thereof, which is known to cause some prior art seams to fail. The seam of FIG. 3 is devoid of adhesive bonds between surfaces of laminate layers having different tensile strengths. As shown in FIG. 3, the first strip of adhesive 9 bonds together a pair of outside surfaces 3, 6 of the sheets of fabric 1, 2, and the second strip of adhesive 13 bonds together portions 17, 18 of the same backing surface 7.

Figure 4:
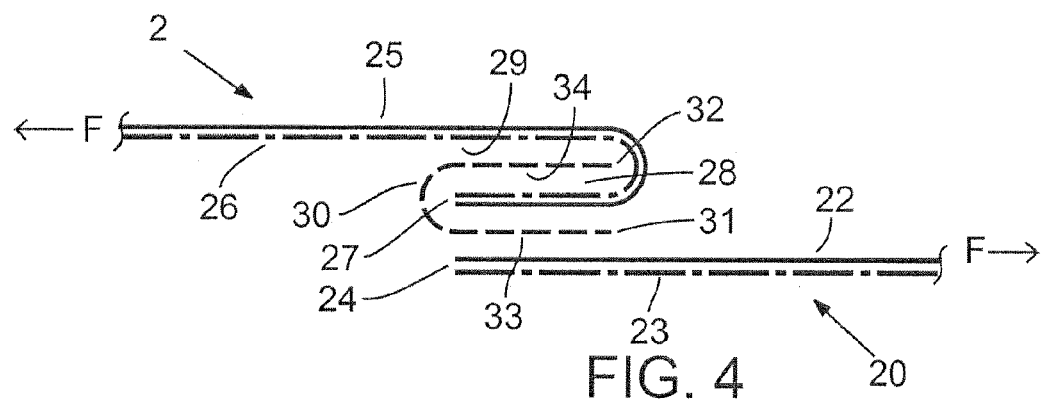
FIG. 4 is a cross-sectional diagram of two sheets of material joined by an adhesively bonded seam in accordance with a second embodiment.

An alternative embodiment is illustrated in FIG. 4, which shows the joining of a first sheet of fabric 20 and a second sheets of fabric 21. In this embodiment, a single strip of adhesive is utilized to form a seam having substantially the same functional characteristics as the seam of the embodiment of FIG. 3. With reference to FIG. 4, the first sheet of fabric 20 has an outside or facing surface 22 (depicted as a solid line), an inside or backing surface 23 (depicted as a broken line), and an elongate edge 24. Similarly, the second sheet of fabric 21 has an outside or facing surface 25 (depicted as a solid line), an inside or backing surface 26 (depicted as a broken line), and an elongate edge 27. The second sheet of fabric 21 is folded such that a first portion 28 of the inside surface 26 of the second sheet of fabric 21 is opposite a second portion 29 of the inside surface 26 of the second sheet of fabric 21. A single elongate strip of adhesive 30 having a first longitudinal edge 31 and an opposite second longitudinal edge 32, is folded in half lengthwise, thereby forming an inside adhesive strip portion 33 and an outside adhesive strip portion 34 extending from a longitudinal fold. The folded strip of adhesive 30 is then positioned adjacent the folded second sheet of fabric 21, such that the outside adhesive strip portion 34 and the second longitudinal edge 32 are positioned between and adjacent the first and second portions 28 and 29 of the second sheet of fabric 21, and so that the first longitudinal edge 31 is positioned adjacent the outside surface 25 of the second sheet of fabric 21. The outside surface 22 of the first sheet of fabric 20 is then positioned against the inside strip portion 33 of the folded strip of adhesive 30. After assembly of the sheets of fabric 20, 21 and strip of adhesive 30, energy is applied to the adhesive (in the form of ultrasonic sound pressure or otherwise) to activate, soften, or melt the adhesive, to thereby complete the seam bonding process.

Figure 5:
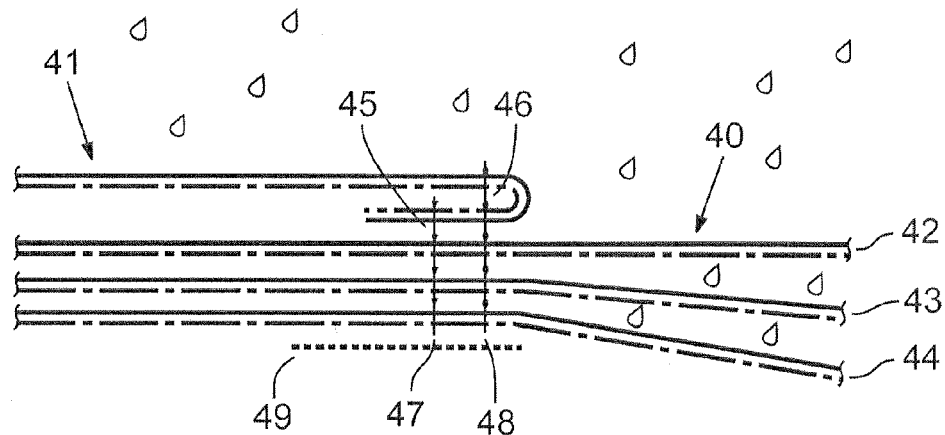
FIG. 5 (PRIOR ART) is a cross-sectional diagram depicting a stitched seam joining a piece of fabric to a garment comprising a multi-layer laminate fabric, to thereby form a pocket on the garment.
Figure 6:
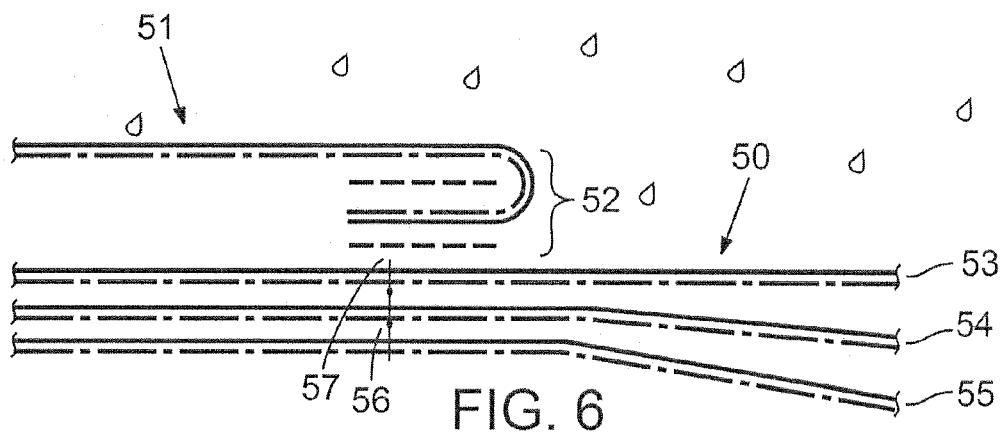
FIG. 6 is a cross-sectional diagram of a sheet of material adhesively bonded to an outer surface of a garment comprising a multi-layer laminate fabric, to thereby form a pocket on the garment.

The following discussion pertaining to FIGS. 5 and 6 illustrates a specific application of the adhesively bonded seam of FIG. 3 to garments formed of laminate fabrics.

FIG. 5 illustrates the conventional manner in which a layer of fabric for a jacket pocket is stitched to the body of a jacket constructed from a laminate fabric having several layers. As shown in FIG. 5, the laminate fabric of a jacket body 40 has an outside or facing layer 42 that is abrasion resistant; a middle layer 43 that is waterproof, windproof, and breathable; and an inside or backing layer 44 that protects the middle layer 43. A jacket pocket 41 is sewn onto the jacket body 40 by forming a join stitch 45 which extends through an inside portion of the pocket 41 and through all three laminated layers 42, 43, 44 of the jacket body 40. The pocket 41 is further secured to the jacket body 40 by a top stitch 46 which extends through an outside portion of the pocket, the inside portion of the pocket, and all three laminated layers 42, 43, 44 of the jacket body 40. The join stitch 45 and the top stitch 46 tend to wick moisture (shown in the figure as rain drop shapes) from the outside of the garment to the inside via capillary action. In an attempt to preserve the waterproof characteristic of the garment, an inside portion 47 of the join stitch 45 and an inside portion 48 of the top stitch 46 are covered with a waterproof seam tape 49. However, moisture still is able to wick along the stitches 45, 46 through the waterproof middle layer 43 and then migrate laterally along the backing layer 44 and around the edges of the seam tape 49, compromising the waterproof characteristic of the garment.

FIG. 6 illustrates the manner in which the present invention can be used to overcome the failure of the conventional seam construction described in connection with FIG. 5 to provide a garment that is truly waterproof (to the full capability of the fabric itself). With reference to FIG. 5, a pocket 51 is adhesively bonded to the outside surface 53 of a jacket 50 by utilizing the method described above in connection with FIG. 3, thereby forming a pocket seam 52. The pocket seam 52 attaches the pocket 51 to the jacket 50 such that the seam 52 covers an outside portion 57 of a join seam 56. In this instance, the join stitch 56 is not used to attach the pocket 51 to the jacket 50 as in the conventional technique; rather the join stitch 56 is only used to bind the jacket's outside or facing layer 53, middle layer 54 and inside or backing layer 55 together where the seam is adhesively bonded to the jacket 50. In one alternative embodiment (not shown), the join stitch 56 also binds a first portion (corresponding to first portion 17 of FIG. 3) of the pocket 40, but not the overlapping second portion; and in another alternative embodiment (not shown), the join stitch 56 is omitted altogether. As also shown in FIG. 6, using seams according to the embodiments described herein to attach the pocket 51 to the jacket 50 may eliminate the need for a conventional top stitch because the pocket 51 will not readily separate from the jacket 50. By omitting the top stitch and covering the outside portion 57 of the join stitch 56 with adhesive, two leak paths of the prior-art seam (FIG. 5) are eliminated. The seam construction of FIG. 6 may also eliminate the need for the expensive waterproof seam tape 49 (FIG. 5).

Figure 7:
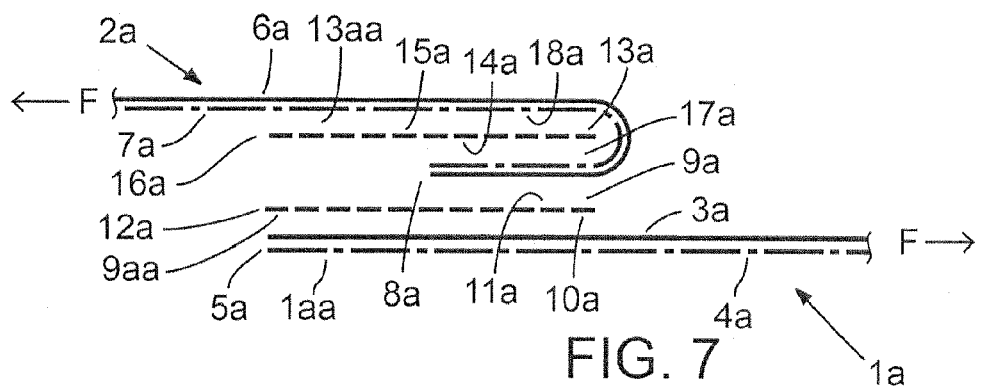
FIG. 7 is a cross-sectional diagram of two sheets of material joined by an adhesively bonded seam in accordance with a third embodiment.
Figure 8:
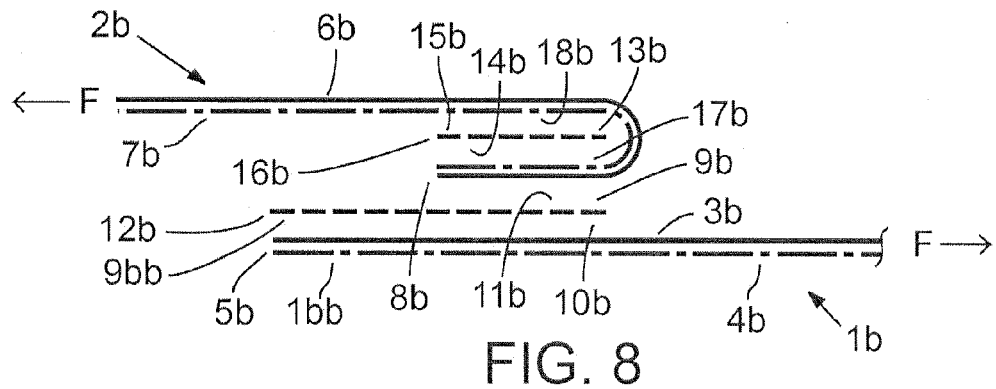
FIG. 8 is a cross-sectional diagram of two sheets of material joined by an adhesively bonded seam in accordance with a fourth embodiment.
Figure 9:
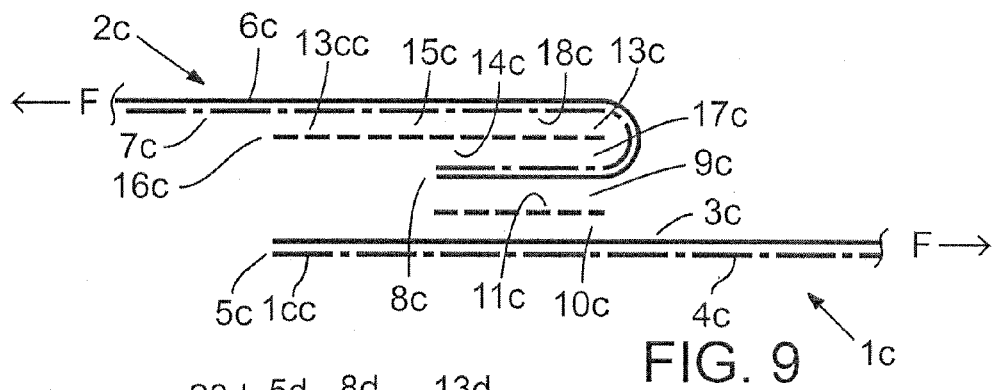
FIG. 9 is a cross-sectional diagram of two sheets of material joined by an adhesively bonded seam in accordance with a fifth embodiment.

Additional embodiments are illustrated in FIGS. 7, 8, and 9. Referring first to FIG. 7, a first sheet of fabric 1a has an outside or facing surface 3a (depicted as a solid line), an inside or backing surface 4a (depicted as a broken line), and an elongate edge 5a. Similarly, a second sheet of fabric 2a has an outside or facing surface 6a (depicted as a solid line), an inside or backing surface 7a (depicted as a broken line), and an elongate edge 8a. The outside surface 3a of the first sheet of fabric 1a is positioned proximal to the outside surface 6a of the second sheet of fabric 2a and overlapping the edge 8a of the second sheet of fabric 2a, thereby forming an overlapping seam portion 1aa. A first elongate strip of adhesive 9a, having first and second sides 10a and 11a, respectively, and a longitudinal edge 12a, is positioned between the first and second sheets of fabric, 1a and 2a, respectively, such that the first side 10a of the first strip of adhesive 9a is against the outside surface 3a of the first sheet of fabric 1a and a portion of the second side 11a of the first strip of adhesive 9a is against the outside surface 6a of the second sheet of fabric 2a. The longitudinal edge 12a of the first strip of adhesive 9a is preferably positioned adjacent the edge 5a, of the first sheet of fabric 1a and such that the second side 11a of the first strip of adhesive 9a overlaps edge 8a of the second sheet of fabric 2a, thereby forming a first overlapping adhesive portion 9aa. A elongate second strip of adhesive 13a, having first and second sides 14a, and 15a, respectively, and a longitudinal edge 16a, is positioned such that its first side 14a, is against a first portion 17a of the inside surface 7a of the second sheet of fabric 2a and overlapping the edge 8a of the second sheet of fabric 2a, thereby forming a second overlapping adhesive portion 13aa. The second sheet of fabric 2a is folded such that a second portion 18a of its inside surface 7a overlies the second side 15a, of the second strip of adhesive 13a. Energy may be applied to the adhesive strips 9a, 13a (in one or more doses or passes) in a similar manner as described above with reference to FIG. 3, to thereby complete the seam.

The seam illustrated in FIG. 7 includes advantageous features similar to the seam illustrated in FIG. 3. In addition, the seam of FIG. 7 contains the overlapping seam portion 1aa and overlapping adhesive portions 9aa and 13aa, which may enhance its strength and durability. These overlapping seam and adhesive portions 1aa, 9aa, and 13aa result in an exposed raw edge 5a, of the seam of FIG. 7 that is thinner than the exposed aligned edges 5, 8 of the seam of FIG. 3 and, therefore, less likely to fray or catch on clothing worn underneath.

The seam construction illustrated in FIG. 7 is also proven to be stronger than the seam construction of FIG. 3. The inventors have determined in stress tests that, for laminate fabrics, the weakest portion of the seam of FIG. 3 is the region where the first and second portions 17 and 18 of the inside surface 7 of the second sheet of fabric 2 are bonded together. The inventors have further determined, however, that this weak portion of the seam is made substantially stronger by constructing the seam as illustrated in FIG. 7. The seam of FIG. 7 is stronger than the seam of FIG. 3 apparently because of the addition of overlapping seam portion 1aa and overlapping adhesive portion 9aa, which provide an adhesive bond overlapping the edge 8a of the second sheet of fabric 2a.

FIGS. 8 and 9 illustrate two additional embodiments, both of which are variations on the seam of FIG. 7. The seam component parts identified by reference numbers 1a through 18a and 1aa in FIG. 7 correspond to the same seam component parts identified by reference numbers 1b through 18b and 1bb in FIG. 8 and to the same seam component parts identified by reference numbers 1c through 18c and 1cc in FIG. 9. In FIG. 8, the second strip of adhesive 13b is made narrower than the second strip of adhesive 13a of FIG. 7, so that the edge 16b of the second strip of adhesive 13b is adjacent the edge 8b of the second sheet of fabric 2b. An overlapping portion 9bb of the first strip of adhesive 9b bonds the outer surface 3b of the first sheet of fabric 1b to the second portion 18b of the inside surface 7b of the second sheet of fabric 2b. In FIG. 9, the first strip of adhesive 9c is made narrower than the first strip of adhesive 9a of FIG. 7, so that the edge 12c of the second strip of adhesive 9c is adjacent the edge 8c of the second sheet of fabric 2c. An overlapping portion 13cc of the second strip of adhesive 13c bonds the outer surface 3c of the first sheet of fabric 1c to the second portion 18c of the inside surface 7c of the second sheet of fabric 2c.

In still another embodiment (not shown), the first and second strips of adhesive 9a and 13a of FIG. 7 are replaced by a single folded strip of adhesive having a longitudinal fold positioned adjacent the edge 5a of the first sheet of fabric 1a and between the outside surface 3a of the first sheet of fabric 1a and the second portion 18a of the inside surface 7a of the second sheet of fabric 2a.

Figure 10A:
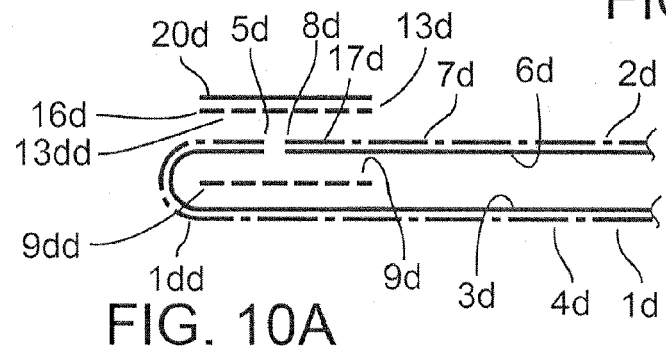
FIGS. 10A and 10B are cross-sectional diagrams depicting an adhesively bonded S-seam according to a sixth embodiment, in partly assembled and fully assembled conditions, respectively.
Figure 10B:
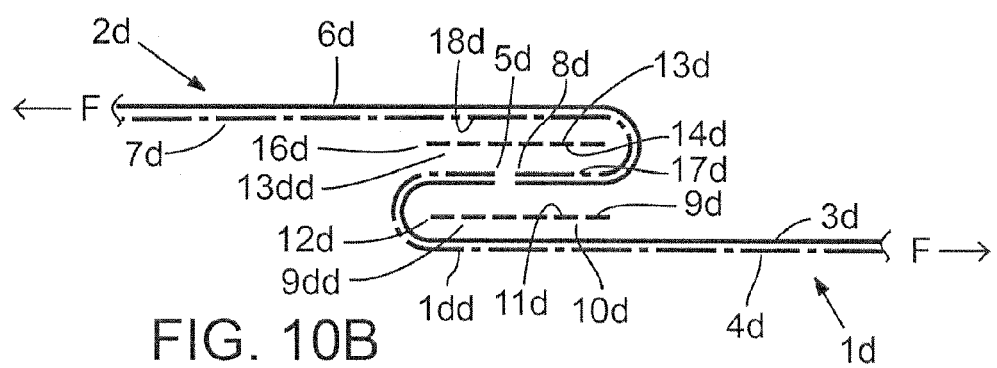

An adhesively bonded seam according to yet another embodiment is shown in FIG. 10B, with FIG. 10A depicting the seam of FIG. 10B in a partially assembled condition. The seam of FIG. 10B is referred to herein as an S-seam, owing to its cross sectional configuration. Reference numbers 1d through 18d, 1dd, 9dd, and 13dd in FIGS. 10A and 10B correspond to seam component parts similar to those identified by reference numbers 1a through 18a, 1aa, 9aa, and 13aa in FIG. 7. With reference to FIG. 10A, an edge 8d of the second sheet of material 2d is positioned between the first and second strips of adhesive 9d and 13d so as to define overlapping portions 9dd and 13dd of the respective first and second strips of adhesive 9d and 13d that overlap and extend beyond the edge 8d. The outside surface 6d of the second sheet of material 2d is positioned adjacent the first strip of adhesive 9d. The first sheet of material 1d is also positioned with its outside surface 3d adjacent the first strip of adhesive 9d, opposite the second sheet of material 2d and overlapping the first strip of adhesive 9d. The first sheet of material 1d is folded along its edge 5d and the edge 5d is positioned between the overlapping portions 9dd and 13dd of the first and second strips of adhesive 9d and 13d. The edges 5d and 8d of the respective first and second sheets of material 1d and 2d may overlap slightly where they meet between the strips of adhesive 9d and 13d; however, preferably they abut or are positioned with a slight space therebetween (as shown in FIGS. 10A and 10B) to minimize the overall thickness of the S-seam. Thus, the second strip of adhesive 13d is positioned adjacent the inner surfaces 4d and 7d of the first and second sheets of material 1d and 2d, respectively, opposite the second strip of adhesive 9d and covering the edges 5d and 8d of the respective first and second sheets of material 1d and 2d. A protective backing sheet of release paper 20d is preferably left in place on the second strip of adhesive opposite the edges 5d and 8d of the sheets of material 1d and 2d while energy is applied to the adhesive in a first dose or pass to bond the adhesive strips to the sheets of material and to hold the sheets of material 1d and 2d in the configuration shown in FIG. 10A. Thereafter the release paper 20d is removed, the second sheet of material 2d is folded as shown in FIG. 10B so that the second portion 18d of the second sheet of material 2d overlies the second strip of adhesive 9d. After folding the second sheet of material 2d, energy is applied to the second strip of adhesive 13d in a second dose or pass, to thereby form a completed adhesively bonded S-seam. In an alternative embodiment, folder attachments may be used in conjunction with an ultrasonic seam bonding machine or other stitchless seam bonding machine (not shown) for guiding the first and second strips of adhesive 9d and 13d and for guiding and folding the first and second sheets of material 1d and 2d as they are fed into the seam bonding machine, to thereby achieve the S-seam of FIG. 10B in a single pass through the machine. In this alternative embodiment, the release paper of FIG. 10A may be omitted from the second strip of adhesive 13d.

Throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Furthermore, the described features, structures, or characteristics may be combined in any suitable manner in one or more embodiments. Moreover, the various embodiments can be practiced without one or more of the specific details or with other methods, components, materials, etc. In other instances, well-known structures, materials, or operations are not shown or not described in detail to avoid obscuring aspects of the embodiments.

It will be obvious to those having skill in the art that many changes may be made to the details of the above-described embodiments without departing from the underlying principles thereof. The scope of the invention should, therefore, be determined only by the following claims.

The invention claimed is:

1. A method of forming a stitchless seam, comprising:
providing a first sheet of material having inside and outside surfaces and an edge;
providing a second sheet of material having inside and outside surfaces and an edge;
positioning the outside surface of the first sheet of material proximal the outside surface and edge of the second sheet of material, respectively;
providing an elongate first strip of adhesive having opposing first and second sides;
placing the first strip of adhesive between the first and second sheets of material such that the first side of the first strip of adhesive is adjacent the outside surface of the first sheet of material and at least a portion of the second side of the first strip of adhesive is adjacent the outside surface of the second sheet of material along the edge of the second sheet of material;
providing an elongate second strip of adhesive having opposing first and second sides;
placing at least a portion of the first side of the second strip of adhesive against a first portion of the inside surface of the second sheet of material extending along the edge of the second sheet of material;
folding the second sheet of material such that a second portion of the inside surface of the second sheet of material overlies the second side of the second strip of adhesive; and
applying energy to the first and second strips of adhesive to activate the first and second strips of adhesive, whereby the first strip of adhesive joins the outside surface of the first sheet of material to the outside surface of the second sheet of material and the second strip of adhesive joins the first portion of the inside surface of the second sheet of material to the second portion of the inside surface of the second sheet of material, thereby forming a stitchless seam.

2. A method according to claim 1 in which the application of energy includes:
a first step of applying energy to at least one of the first and second strips of adhesive; and
after the first step of applying energy and the placement of both of the first and second strips of adhesive and the folding of the second sheet of material, a second step of applying energy to both of the first and second strips of adhesive.

3. A method according to claim 2 in which the first step of applying energy includes applying energy to only one of the first and second strips of adhesive.

4. A method according to claim 1 further comprising applying compressive force to the first and second sheets of material and the first and second strips of adhesive during the application of energy.

5. A method according to claim 1 further comprising:
positioning the first sheet of material so as to overlap the edge of the second sheet of material and thereby define an overlapping seam portion of the first sheet of material extending beyond the edge of the second sheet of material; and
placing a portion of the first strip of adhesive or a portion of the second strip of adhesive, or both, between the overlapping seam portion of the first sheet of material and the second portion of the second sheet of material and so as to overlap the edge of the second sheet of material.

6. A method according to claim 5 further comprising applying compressive force to the first and second sheets of material and the first and second strips of adhesive during the application of energy.

7. A method according to claim 5 in which the application of energy includes:
a first step of applying energy to at least one of the first and second strips of adhesive; and
after the first step of applying energy and the placement of both of the first and second strips of adhesive and the folding of the second sheet of material, a second step of applying energy to both of the first and second strips of adhesive.

8. A method according to claim 7 in which the first step of applying energy includes applying energy to only one of the first and second strips of adhesive.

9. A method according to claim 1, further comprising:
positioning the first strip of adhesive to define an overlapping portion thereof that overlaps and extends beyond the edge of the second sheet of material;
positioning the second strip of adhesive so that an overlapping portion thereof that overlaps and extends beyond the edge of the second sheet of material;
folding the first sheet of material along its edge; and
positioning the edge of the first sheet of material between the overlapping portions of the first and second strips of adhesive.

10. A method of forming a stitchless seam, comprising:
providing a first sheet of material having inside and outside surfaces and an edge;
providing a second sheet of material having inside and outside surfaces and an edge;
folding the second sheet of material such that a first portion of the inside surface of the second sheet of material is opposite from a second portion of the inside surface of the second sheet of material;
providing an elongate strip of adhesive having opposing first and second longitudinal edges;
folding the strip of adhesive lengthwise to define elongate first and second portions thereof;
positioning the strip of adhesive such that its second longitudinal edge is between the first and second portions of the second sheet of material, and its first longitudinal edge is adjacent the outside surface of the second sheet of material;
placing the outside surface of the first sheet of material against the strip of adhesive opposite the second sheet of material; and
applying energy to the strip of adhesive to activate the adhesive, whereby the first portion of the strip of adhesive joins the outside surface of the first sheet of material to the outside surface of the second sheet of material and the second portion of the strip of adhesive joins the first portion of the inside surface of the second sheet of material to the second portion of the inside surface of the second sheet of material.

11. A method according to claim 10 further comprising positioning the first sheet of material so as to overlap the edge of the second sheet of material and thereby define an overlapping seam portion of the first sheet of material extending beyond the edge of the second sheet of material.

12. A method according to claim 11 in which the folding of the strip of adhesive forms a longitudinal fold of the strip of adhesive, and further comprising placing the longitudinal fold of the strip of adhesive adjacent the edge of the first sheet of material.

13. A method according to claim 10 in which the first and second sheets of material each comprises a waterproof breathable laminate fabric.

14. A method according to claim 10 in which the application of energy includes applying ultrasonic sound pressure.

15. A method according to claim 10 in which the application of energy includes applying electromagnetic radiation.

16. A method according to claim 10 in which the application of energy includes applying radio frequency radiation.

17. A method according to claim 10 in which the application of energy includes applying microwave radiation.

18. A method according to claim 10 in which the application of energy includes applying heat.

19. A method according to claim 10 further comprising applying compressive force to the first and second sheets of material and the strip of adhesive during the application of energy.

20. A garment made by a method according to claim 10.

21. A garment according to claim 20 in which the first and second sheets of material each comprise a waterproof breathable laminate fabric.

22. A shoe made by a method according to claim 10.

23. A sports article made by a method according to claim 10.

24. A tent made by a method according to claim 10.

25. A stitchless for a garment or sports article, comprising:
a first sheet of material having inside and outside surfaces and an edge,
a second sheet of material having inside and outside surfaces and an edge, the outside surface and edge of the second sheet of material being positioned proximal the outside surface of the first sheet of material, the inside surface of the second sheet of material including a first portion extending along the edge of the second sheet of material, and the second sheet of material being folded so the first portion is opposite a second portion of the inside surface of the second sheet of material;
an elongate first strip of adhesive having opposing first and second sides, the first strip of adhesive positioned between the first and second sheets of material such that the first side of the first strip of adhesive is adjacent the outside surface of the first sheet of material and at least a portion of the second side of the first strip of adhesive is adjacent the outside surface of the second sheet of material along the edge of the second sheet of material;
an elongate second strip of adhesive having opposing first and second sides, at least a portion of the first side of the second strip of adhesive being positioned against the first portion of the inside surface of the second sheet of material and the second side of the second strip of adhesive being positioned against the second portion of the inside surface of the second sheet of material; and
the first strip of adhesive joining the outside surface of the first sheet of material to the outside surface of the second sheet of material and the second strip of adhesive joining the first portion of the inside surface of the second sheet of material to the second portion of the inside surface of the second sheet of material, to thereby form a stitchless seam.

26. A stitchless seam according to claim 25 in which:
the first sheet of material overlaps the edge of the second sheet of material to thereby define an overlapping portion of the first sheet of material extending beyond the edge of the second sheet of material; and
a portion of the first strip of adhesive or a portion of the second strip of adhesive or both, is positioned between the overlapping seam portion of the first sheet of material and the second portion of the second sheet of material so as to overlap the edge of the second sheet of material and to form an adhesive bond between the first sheet of material and the second portion of the second sheet of material.

27. A stitchless seam according to claim 25 in which:
the first strip of adhesive is positioned to define an overlapping portion thereof that overlaps and extends beyond the edge of the second sheet of material;
the second strip of adhesive is positioned to define an overlapping portion thereof that overlaps and extends beyond the edge of the second sheet of material;
the first sheet of material is folded along its edge; and the edge of the first sheet of material is positioned between the overlapping portions of the first and second strips of adhesive.

28. A stitchless seam for a garment or sports article, comprising:
   a first sheet of material having inside and outside surfaces and an edge;
   a second sheet of material having inside and outside surfaces and an edge, the second sheet of material folded such that a first portion of the inside surface of the second sheet of material is opposite from a second portion of the inside surface of the second sheet of material;
   an elongate strip of adhesive folded lengthwise to define elongate first and second portions thereof, the strip of adhesive having opposing first and second longitudinal edges, the first longitudinal edge being positioned adjacent the outside surface of the second sheet of material and the second longitudinal edge being positioned between the first and second portions of the second sheet of material, the outside surface of the first sheet of material being positioned against the strip of adhesive opposite the second sheet of material, and the first portion of the strip of adhesive joining the outside surface of the first sheet of material to the outside surface of the second sheet of material and the second portion of the strip of adhesive joining the first portion of the inside surface of the second sheet of material to the second portion of the inside surface of the second sheet of material.

29. A stitchless seam according to claim 28 in which the first sheet of material overlaps the edge of the second sheet of material to define an overlapping seam portion of the first sheet of material extending beyond the edge of the second sheet of material.

30. A stitchless seam according to claim 29 in which the strip of adhesive includes a longitudinal fold positioned adjacent the edge of the first sheet of material.

31. A stitchless seam according to claim 28 in which the first and second sheets of material each comprise a waterproof breathable laminate fabric.

32. A garment including a stitchless seam according to claim 28.

33. A garment according to claim 32 in which the first and second sheets of material each comprises a waterproof breathable laminate fabric.

34. A shoe including a stitchless seam according to claim 28.

35. A sports article including a stitchless seam according to claim 28.

36. A tent including a stitchless seam according to claim 28.

37. A method according to claim 1 in which the first and second sheets of material each comprises a waterproof breathable laminate fabric.

38. A method according to claim 1 in which the application of energy includes applying ultrasonic sound pressure.

39. A method according to claim 1 in which the application of energy includes applying electromagnetic radiation.

40. A method according to claim 1 in which the application of energy includes applying radio frequency radiation.

41. A method according to claim 1 in which the application of energy includes applying microwave radiation.

42. A method according to claim 1 in which the application of energy includes applying heat.

43. A method according to claim 1 further comprising applying compressive force to the first and second sheets of material and the strip of adhesive during the application of energy.

44. A garment made by a method according to claim 1.

45. A garment according to claim 44 in which the first and second sheets of material each comprise a waterproof breathable laminate fabric.

46. A shoe made by a method according to claim 1.

47. A sports article made by a method according to claim 1.

48. A tent made by a method according to claim 1.

49. A stitchless seam according to claim 25 in which the first and second sheets of material each comprise a waterproof breathable laminate fabric.

50. A garment including a stitchless seam according to claim 25.

51. A garment according to claim 50 in which the first and second sheets of material each comprises a waterproof breathable laminate fabric.

52. A shoe including a stitchless seam according to claim 25.

53. A sports article including a stitchless seam according to claim 25.

54. A tent including a stitchless seam according to claim 25.

* * * * *

UNITED STATES PATENT AND TRADEMARK OFFICE
CERTIFICATE OF CORRECTION

PATENT NO.         : 7,455,743 B2
APPLICATION NO.    : 11/569494
DATED              : November 25, 2008
INVENTOR(S)        : Kramer et al.

It is certified that error appears in the above-identified patent and that said Letters Patent is hereby corrected as shown below:

Title Page
Related U.S. Application Data
Item (63) should read --National Stage under 35 USC § 371 of International Application No. PCT/US2005/018135 filed on May 23, 2005, which is a Continuation-in-part of application No. 10/851,409, filed May 21, 2004, now Pat. No. 7,005,021.--

Abstract
Line 3, change "surface" to --surfaces--.

Column 1
Line 48, change "900" to --90°--.

Column 7
Line 50, change "5a," to --5a--.
Line 55, change "14a," to --14a--.
Line 56, change "14a," to --14a--.
Line 62, change "15a," to --15a--.

Column 8
Line 5, change "5a," to --5a--.

Column 12
Line 13, after "stichless" add --seam--.
Line 15, change "edge," to --edge;--.
Line 53, after "adhesive" add --,--.

Signed and Sealed this

Eighteenth Day of August, 2009

David J. Kappos
*Director of the United States Patent and Trademark Office*